United States Patent

Ganaja

Patent Number: 5,149,034
Date of Patent: Sep. 22, 1992

[54] SADDLE POSITIONING DEVICE FOR BICYCLES

[76] Inventor: Scott Ganaja, 2011 Morgan La., Redondo Beach, Calif. 90278

[21] Appl. No.: 742,614

[22] Filed: Aug. 8, 1991

[51] Int. Cl.⁵ ............................................. F16M 11/04
[52] U.S. Cl. .................................. 248/178; 248/287; 280/281.1; 297/195
[58] Field of Search ..................... 248/295.1, 408, 178, 248/287, 298, 187; 297/195, 345; 280/288.4, 281.1

[56] References Cited

U.S. PATENT DOCUMENTS

| | | | |
|---|---|---|---|
| 572,273 | 12/1896 | Peterson | 297/195 |
| 578,011 | 3/1897 | Giradet . | |
| 2,644,504 | 7/1953 | Vick | 155/5.24 |
| 3,861,740 | 1/1975 | Tajima | 297/195 |
| 4,150,851 | 4/1979 | Cienfuegos | 297/195 |
| 4,580,835 | 4/1986 | Angell | 297/195 |
| 4,657,270 | 4/1987 | Allen | 280/281.1 X |
| 4,772,069 | 9/1988 | Szymski | 297/195 |
| 4,872,696 | 10/1989 | Gill | 280/281.1 |
| 4,919,378 | 4/1990 | Iwasaki | 248/295.1 |
| 5,007,675 | 4/1991 | Musto | 297/195 |
| 5,044,592 | 9/1991 | Cienfuegos | 248/408 |

FOREIGN PATENT DOCUMENTS

27076 of 1897 United Kingdom ................ 297/195

*Primary Examiner*—J. Franklin Foss

[57] ABSTRACT

A saddle positioning device for bicycles comprising a slide member, a slide rack, a plunger pin, and a release lever. The slide member having an upper portion for mounting a saddle is slidable relative to the slide rack. The slide rack is angled obliquely upward and forward and has a rectangular cross section. In addition, a seat post is attached to the lower portion of the slide rack for mounting into a bicycle frame. The spring biased plunger pin is housed within the slide rack and engages one of several holes in the slide member, fixing the position of the slide member. A cable, tensioned by the handlebar mounted release lever, retracts the plunger pin for repositioning.

6 Claims, 3 Drawing Sheets

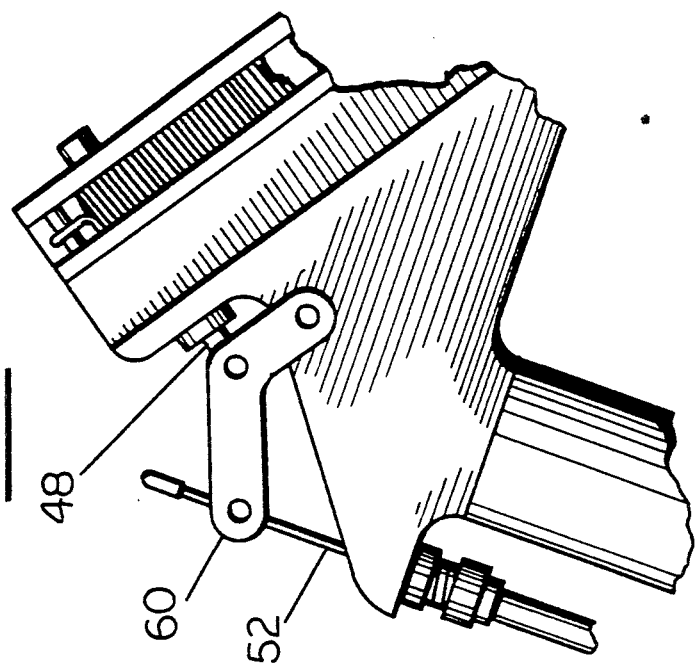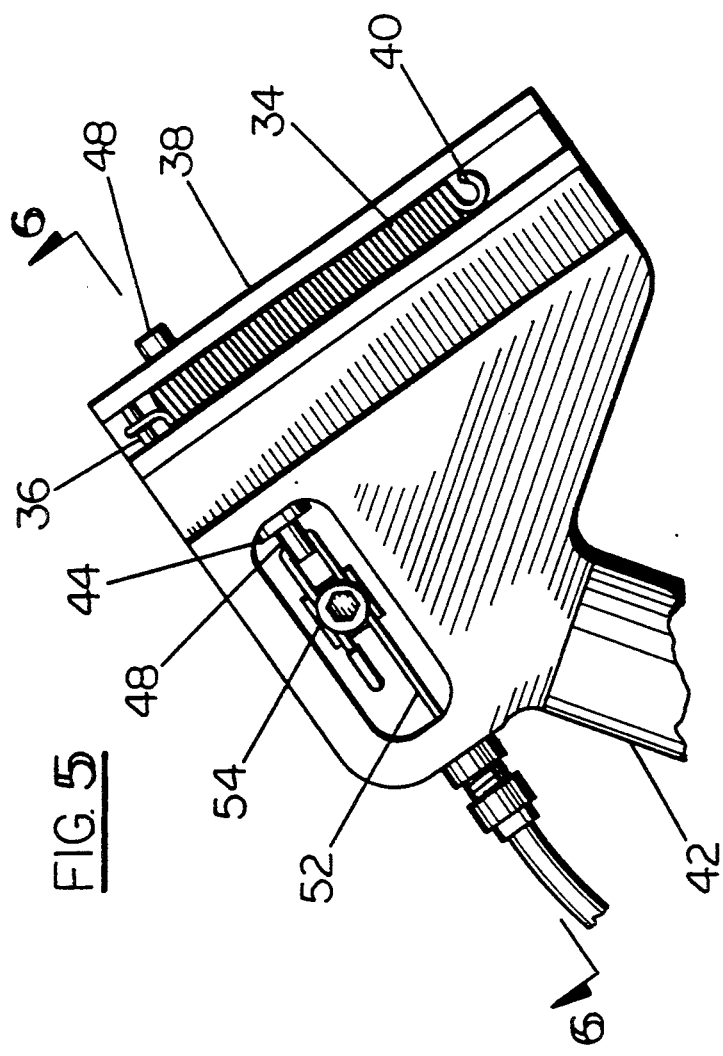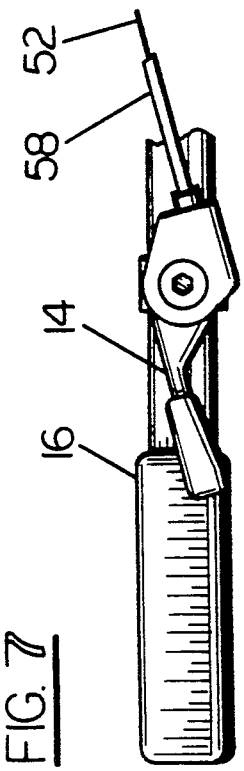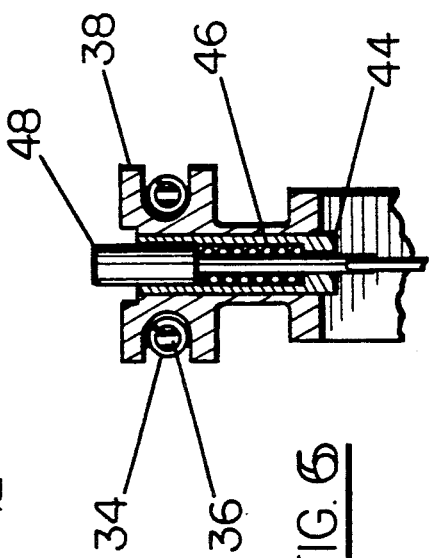

SADDLE POSITIONING DEVICE FOR BICYCLES

BACKGROUND

1. Field of Invention

This invention relates to bicycles, specifically to a saddle positioning device. It relates particularly to a mechanism which allows simultaneous positional adjustment of a bicycle saddle forwardly and upwardly, and rearwardly and downwardly.

2. Discussion of Prior Art

All terrain bicyclists have special requirements for saddle positioning systems. The correct saddle position is the most important requirement, simplicity of operation, safety and durability also being important concerns.

When pedaling up a slope, the preferred saddle position is upward and forward. This allows extension of the bicyclists legs which permits maximum power output, and a shift of the riders weight forward for improved weight distribution. When riding down a slope or on very uneven terrain most bicyclists prefer a downward and rearward saddle position. The lower saddle height provides additional clearance between the saddle and the rider, while the rearward positioning increases stability the angle of the sliding mechanism is greater than 40 degrees from horizontal to ensure a significant change in saddle height (leg extension) when the saddle is moved to the rearward position.

Heretofore saddle position adjusting devices have addressed some, but not all, of the special requirements for all terrain bicycles. U.S. Pat. No. 4,772,069 to Szymski, 1988, describes a longitudinally adjustable saddle mounting. The invention does not address the need for simultaneous upward or downward adjustment. U.S. Pat. No. 4,919,378 to Iwasaki and Shogo, 1990, describes a support structure for a bicycle saddle which extends obliquely upwardly and forwardly. The invention allows correct positioning of the saddle but the design is not necessarily suited to rough all terrain bicycling use. Operating the adjustment lever requires removing one hand from the handlebar which is unsafe and undesirable. The cylindrical shape of the oblique sliding post has poor resistance to torsional loads imposed by lateral forces on the saddle. The indirect load path, from the saddle to the frame, also increases deflections and reduces strength.

OBJECTS AND ADVANTAGES

Accordingly, several objects and advantages of the invention are:

(a) to provide at least one obliquely upward and forward saddle position;

(b) to provide at least one obliquely downward and rearward saddle position, for off-road descending or on uneven terrain;

(c) to provide discrete saddle positions allowing a bicyclist to easily locate predetermined preferred positions, even on rough terrain;

(d) to provide a simple and safe means of operation which does not require a bicyclist to remove their hands from the handlebar;

(e) to provide a saddle positioning device with strength and durability through the use of a non-circular cross section in the sliding mechanism, and using a more direct load path from the saddle to the frame.

Further objects and advantages of the invention will become apparent from a consideration of the drawings and ensuing description of it.

BRIEF DESCRIPTION OF DRAWINGS

FIG. 5 is an enlarged view of the lower portion of the saddle positioning device of FIG. 1;

FIG. 6 is a sectional view of FIG. 5 taken through line 6—6;

FIG. 7 is a top view of the handlebar portion of the saddle positioning device of FIG. 1;

FIG. 8 is an alternate embodiment of FIG. 5.

DETAILED DESCRIPTION OF DRAWINGS

Figure 1:
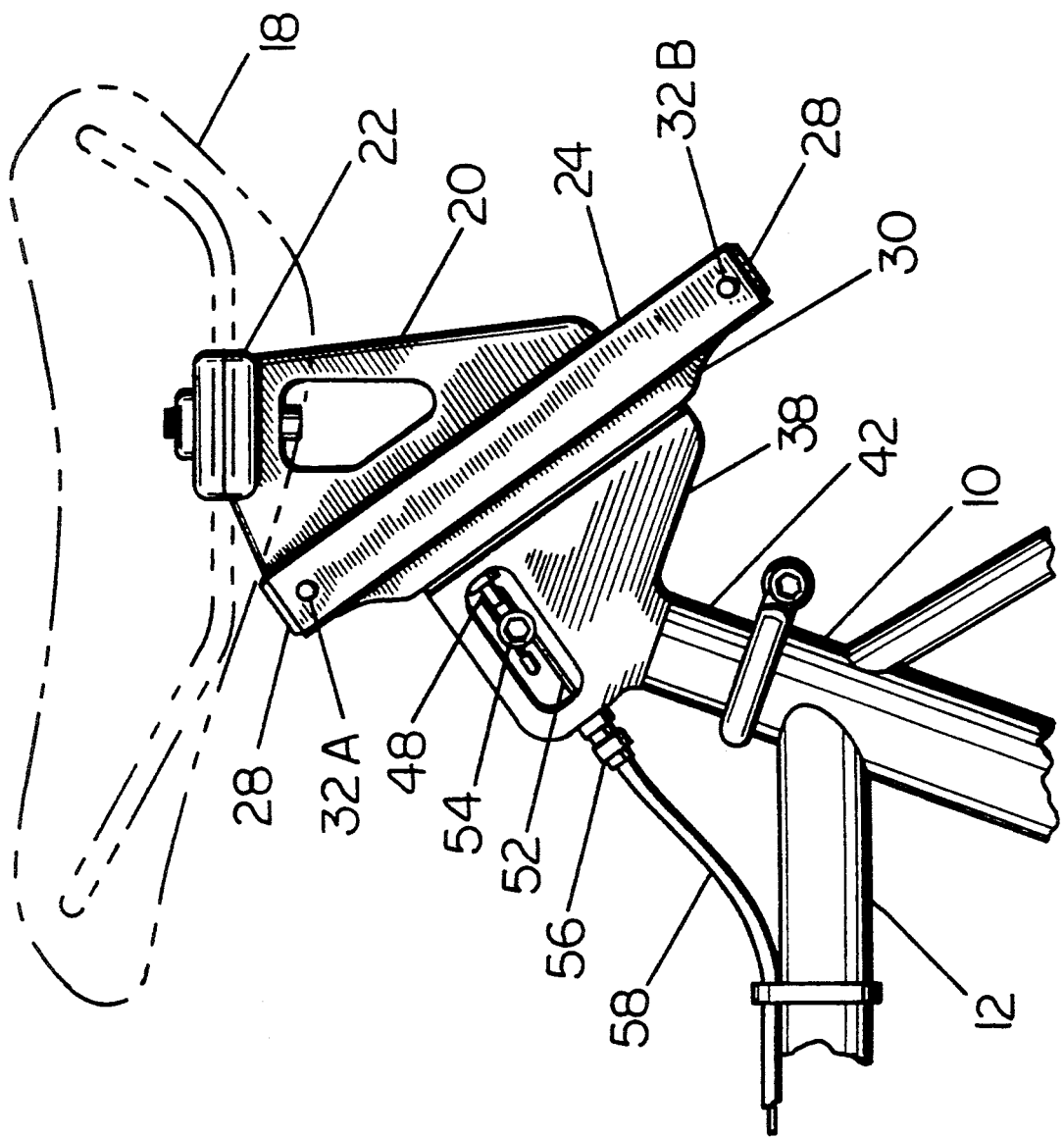
FIG. 1 is a side view of a saddle positioning device mounted onto a bicycle illustrating one embodiment of the invention.
Figure 1:
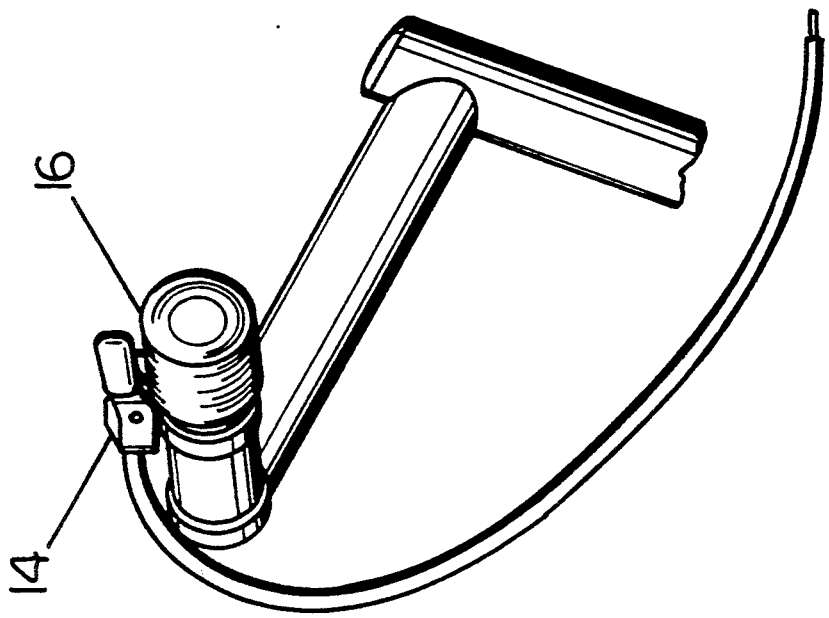

Referring to FIG. 1, a saddle positioning device is shown mounted into a seat tube 10 of a bicycle frame 12. A release lever 14 is shown attached to a bicycle handlebar 16.

Figure 2:
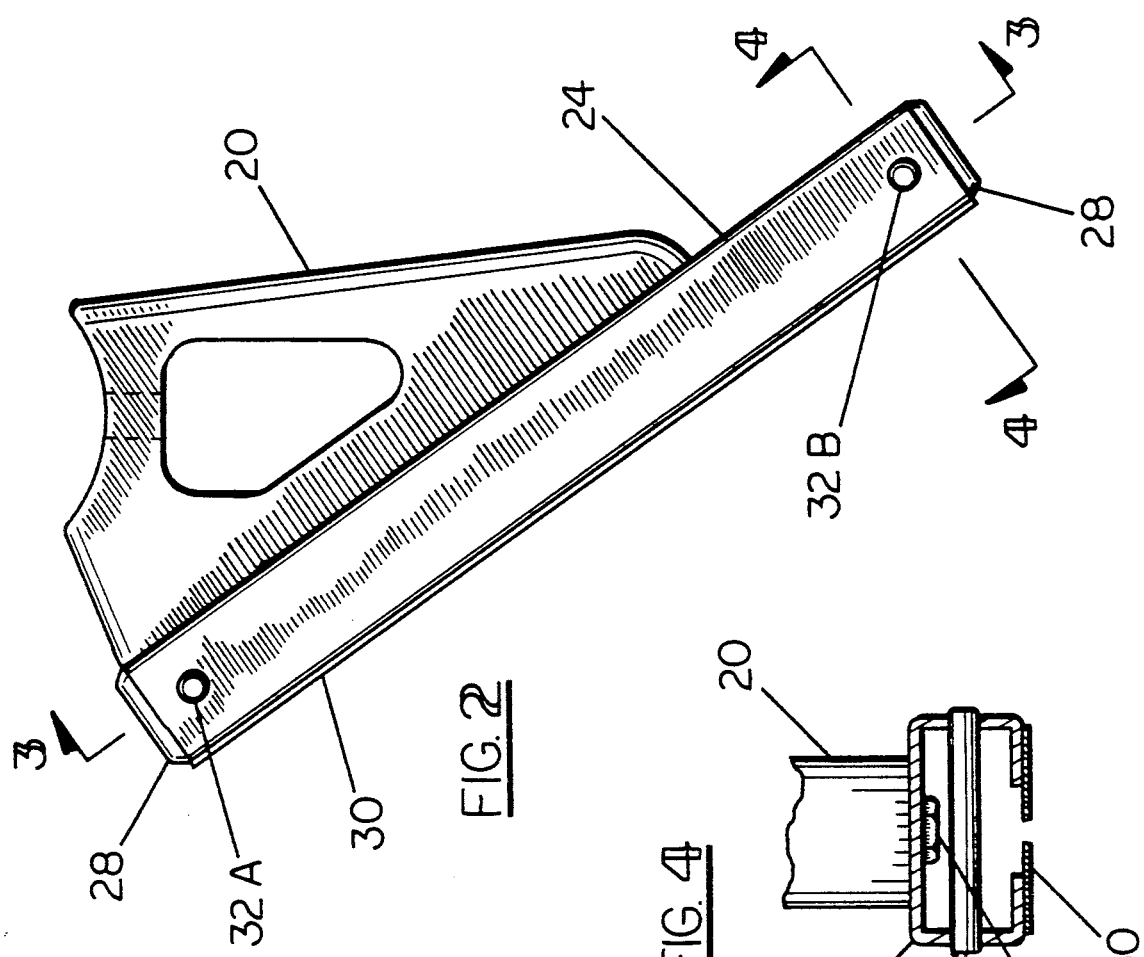
FIG. 2 is an enlarged view of the upper portion of the saddle positioning device of FIG. 1.
Figure 4:
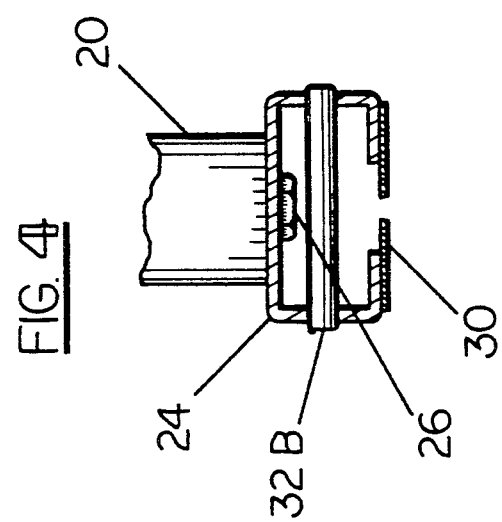
FIG. 4 is a sectional view of FIG. 2 taken through line 4—4.
Figure 3:
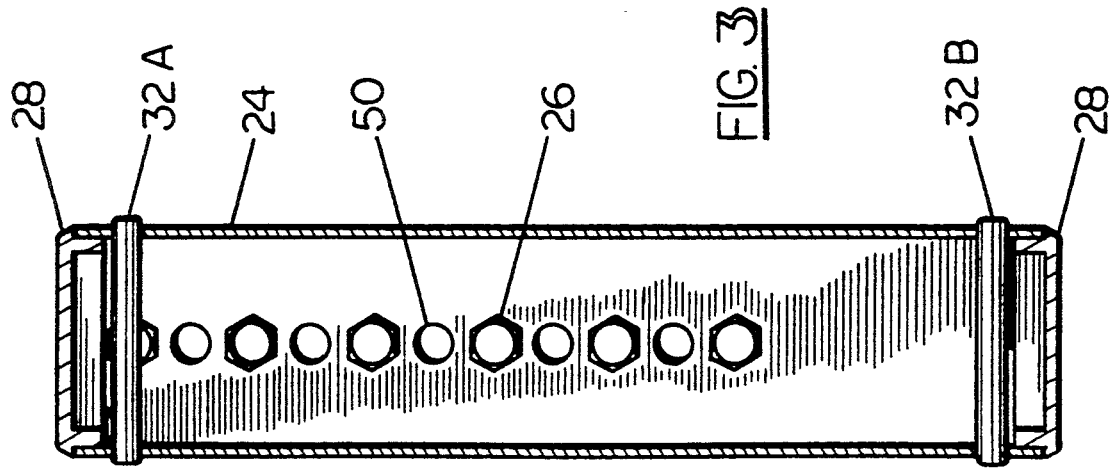
FIG. 3 is a sectional view of FIG. 2 taken through line 3—3.

A conventional saddle 18 is secured to a saddle support structure 20 using a traditional saddle clamp 22. As shown in FIGS. 2, 3, and 4, the saddle support structure 20 is fastened to a slide member 24 using screws 26 or rivets. An alternate embodiment combines the slide member 24 and the saddle support structure 20 into a single unit. End caps 28 and a seal 30 are attached to the slide member 24. An upper pin 32A and lower pin 32B are fitted into opposite ends of the slide member 24. The lower pin 32B also provides an attachment point for return springs 34.

FIGS. 5 and 6 show the return springs 34 fastened by spring pins 36 to a slide rack 38. A lower loop 40 of the return springs 34 attach to the lower pin 32B referenced in FIGS. 2, 3, and 4. The slide member, also referenced in FIGS. 2, 3, and 4, partially envelopes and is slidable relative to the slide rack 38. FIG. 5 shows a seat post 42 attached to the lower part of the slide rack 38.

FIG. 6 shows a plunger body 44 fixed within the slide rack 38. A plunger pin 48 is movable within the bore of the plunger body 44. A plunger spring 46 biases the plunger pin 48 outward. The extended plunger pin 48 engages one of several holes 50 in the slide member 24 shown in FIG. 3.

FIGS. 1 and 5 show a cable 52 secured to the plunger pin 48 using a cable clamp 54. FIG. 1 shows the cable 52 routed through an adjusting barrel 56 and cable housing 58 to the release lever 14.

FIGS. 1 and 7 show the release lever 14 mounted above the handlebar 16 with the cable 52 and the cable housing 58 extending therefrom. An alternate embodiment provides for the mounting of the release lever 14 below the handlebar 16.

FIG. 8 shows an alternate embodiment of FIG. 5 which includes a bellcrank 60 as an intermediate member connecting the cable 52 to the plunger pin 48.

OPERATION OF INVENTION

The saddle positioning device provides for several discrete saddle positions and ease of operation by utilizing a slider mechanism, a locking system, and a release system.

An overview of the slider mechanism is shown in FIG. 1. A saddle 18 is fixed to a saddle support structure 20 by a saddle clamp 22. Screws 26, shown in FIGS. 3 and 4, rigidly attach the saddle support structure 20 to a slide member 24. The slide member 24 partially envelopes and slides freely on a slide rack 38 providing the upward and forward, or downward and rearward positioning. A seat post 42 is attached to the base of the slide rack 38 which provides means for mounting the unit into a standard bicycle frame 12. FIGS. 4 and 6 illustrate the use of rectangular cross sections in the slide member 24 and slide rack 38 to resist axial rotation. As shown in FIG. 1, pins 32A and 32B provide stop means to limit the travel of the slide member 24 relative to the slide rack 38. End caps 28 and seal 30 protect the sliding parts from environmental effects.

FIG. 5 shows return springs 34 which bias the slide member 24 towards the upward and forward position. The weight of the bicyclist lowers the unit. The return springs 34 are anchored to the slide rack 38 using spring pins 36 and are attached to the slide member 30 by lower pin 32B.

FIGS. 3 and 6 most clearly show the components of the locking system. FIG. 3 shows several holes 50 in the slide member 24 which permit discrete positioning of the slide member 24 relative to the slide rack 34. A plunger pin 48 urged by a plunger spring 46, shown in FIG. 6, engages any one of the holes 50, positively locking the slide member 24. FIG. 6 shows a plunger body 44 fixed within the slide rack 38 which houses the plunger spring 46 and plunger pin 48. The plunger pin 48 is retracted by a release system.

The release system is most clearly shown in FIGS. 1, 5, and 7. FIG. 1 shows a cable 52 attached to the plunger pin 48 using a cable clamp 54. The cable 52 is rounted through an adjusting barrel 56 which provides adjustment of the cable tension and of the extension of the plunger pin 48. The cable is further routed through a cable housing 58 to a release lever 14. The release lever 14 is mounted on top of the handlebar 16 and is actuated by thumb pressure forward which causes tension in the cable 52 thereby retracting the plunger pin 48.

FIG. 8 illustrates another embodiment of the release system shown in FIG. 5. An intermediate link 60 joins the cable 52 to the plunger pin 48. This linkage allows repositioning of the cable 52 and also allows a change of the ratio of cable travel to plunger stroke.

SUMMARY, RAMIFICATIONS, AND SCOPE

Thus the reader will see that the saddle positioning device of this invention provides several discrete saddle positions in at least one obliquely upward and forward position, and in at least one obliquely downward and rearward position. In addition, the invention is easily operated from the handlebar. Furthermore, strength and durability are achieved through the use of a slider mechanism with a rectangular cross section and having a direct load path from the saddle to the frame.

While the above description contains many specificities, these should not be construed as limitations on the scope of the invention, but rather as an exemplification of one preferred embodiment thereof. Many other variations are possible. For example, the release lever can be mounted below the handlebar; the return spring can take the form of a flat coiled constant force, helical compression, or torsion spring; the slider mechanism can have a polygonal cross section such as a triangle or trapezoid.

Accordingly, the scope of the invention should be determined not by the embodiments illustrated, but by the appended claims and their legal equivalents.

I claim:

1. A saddle positioning device for bicycles which moves forwardly and upwardly, and rearwardly and downwardly comprising:
    a stationary slide rack angled obliquely upward and forward, with an angle greater than 40 degrees from horizontal, the lower portion thereof with a seatpost for mounting into a bicycle frame;
    a movable slide member partially enveloping and slidable relative to said slide rack, having a polygonal cross section to resist rotation, and having an upper portion with means for mounting a saddle; and
    a locking means to fix the position of said slide member relative to said slide rack.

2. The saddle positioning device of claim 1, wherein said slide member has stop means at opposite ends to limit movement thereof.

3. The saddle positioning device of claim 2, further comprising at least one helical spring having opposite ends contacting said slide member and said slide rack for upwardly and forwardly urging said slide member.

4. The saddle positioning device of claim 3, wherein said locking means includes:
    a plunger pin mounted within said slide rack;
    means biasing said plunger pin towards its extended position; and
    said slide member having a plurality of holes longitudinally aligned to engage said plunger pin allowing repositioning.

5. The saddle positioning device of claim 4, further comprising a cable attached to said plunger pin, a cable tension adjustment means, and a handlebar mounted lever which actuates said cable, retracting said plunger pin.

6. The saddle positioning device of claim 5, further comprising a bellcrank linkage, to change the direction of the cable, in between said plunger pin and said cable.

* * * * *